Sept. 10, 1940. B. G. CARLSON 2,213,976
GYRO-MAGNETIC COMPASS AND AUTOPILOT
Original Filed July 29, 1938 3 Sheets-Sheet 1

INVENTOR
Bert G. Carlson
BY
Herbert H. Thompson
HIS ATTORNEY

Sept. 10, 1940.  B. G. CARLSON  2,213,976
GYRO-MAGNETIC COMPASS AND AUTOPILOT
Original Filed July 29, 1938   3 Sheets-Sheet 2

INVENTOR
Bert G. Carlson
BY
Herbert H. Thompson
HIS ATTORNEY

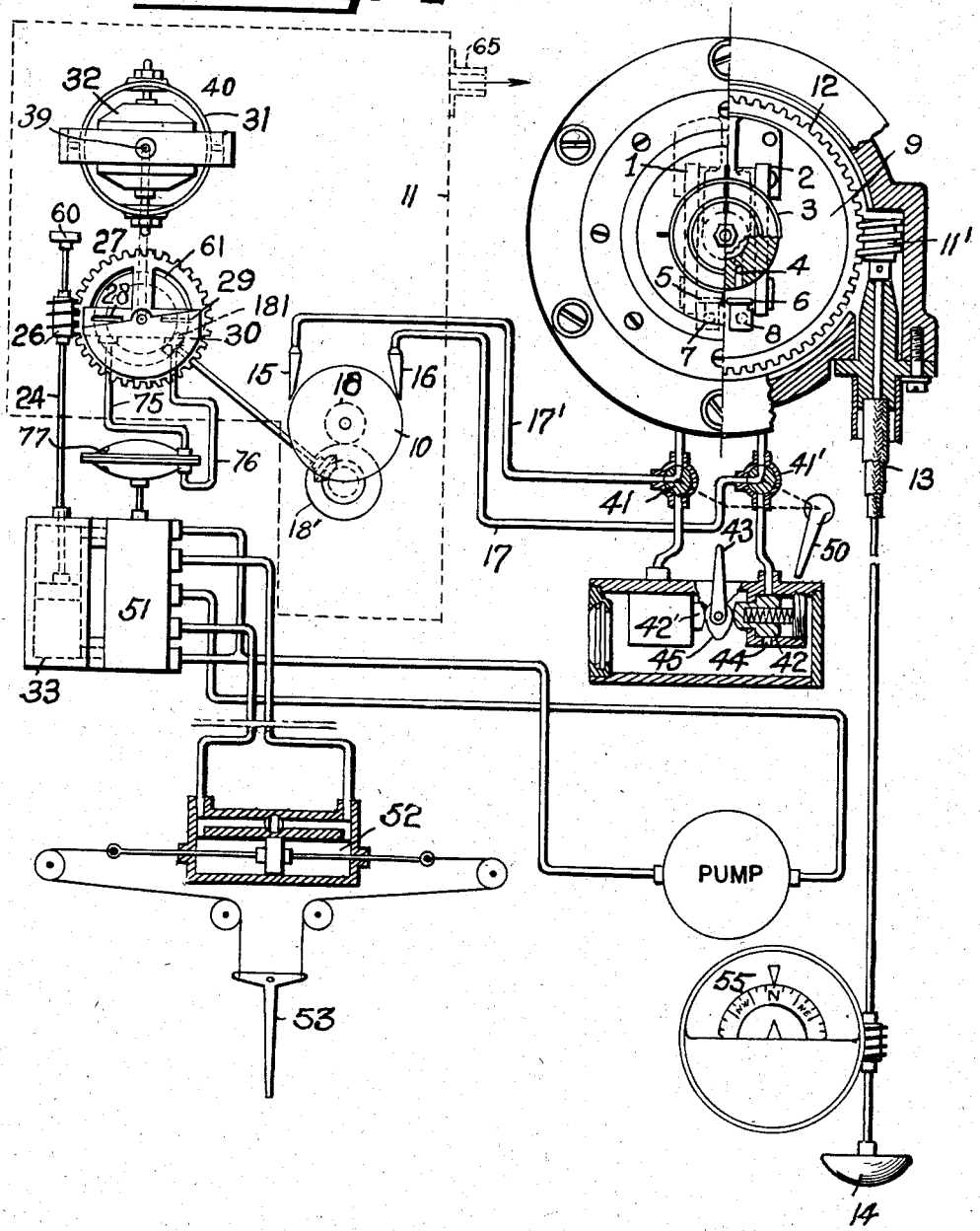

Patented Sept. 10, 1940

2,213,976

UNITED STATES PATENT OFFICE 2,213,976

GYRO-MAGNETIC COMPASS AND AUTOPILOT

Bert Gage Carlson, Freeport, N. Y., assignor to Sperry Gyroscope Company, Inc., Brooklyn, N. Y., a corporation of New York Application July 29, 1938, Serial No. 221,943
Renewed November 8, 1939

8 Claims. (Cl. 244—79)

This invention relates to automatic steering devices for aircraft and other navigable vehicles and, more particularly, to an automatic steering device employing a combination of magnetic compass and directional gyroscope for maintaining the course, such as shown in the prior patent to Elmer A. Sperry, Jr., No. 1,982,702, dated Dec. 4, 1934.

According to my invention, I provide a simplified means for maintaining the gyroscope in a predetermined relation to the magnetic compass, so that wandering of the gyroscope is prevented and it may be read as a magnetic compass or true course indicator.

A further improvement consists in the means for changing course either through the gyroscope or independently thereof from knobs located on the panel, one of which turns the bowl of the magnetic compass and the other is independent.

Referring to the drawings, showing several forms my invention may assume:

Fig. 4 is a plan view, partly in section, of the magnetic compass controller, and also illustrating diagrammatically how the several devices are connected up in the steering system.

Figure 1:
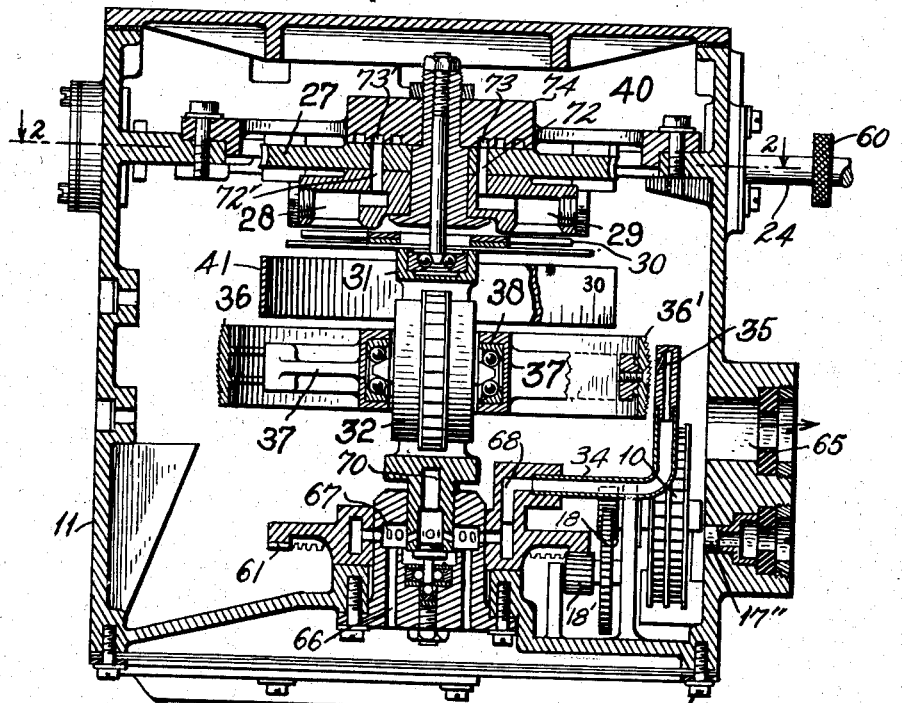
Fig. 1 is a vertical section of a directional gyroscope, showing the controls or pick-off thereon for governing the rudder servo motor, and also my improved means for preventing wandering of the gyroscope.

My invention is shown as employing the same type of magnetic compass master controller as shown in Figs. 7 and 8 of my copending application, now Patent #2,177,242, dated October 24, 1939, for Aircraft automatic pilots. According to said prior patent, however, the magnetic compass did not change the position of the directional gyroscope, but governed the course through the gyroscope merely by changing the relation between the gyroscope and the follow-up pick-off device. According to my present invention, I prefer to maintain the gyroscope in the same direction with respect to the meridian, thereby enabling the gyroscope to be used as a meridian indicator or compass, and also utilizing the integrating and averaging qualities of the gyroscope.

I have shown in Fig. 4 a plan view of an air borne magnetic compass (partly in section) in which the magnetic elements 1 and 2 are supported for rotation about a vertical axis in an air borne button or block 3 which carries a laterally directed air nozzle or port 4, the jet from which normally passes between a pair of spring biased shutters 5 and 6 pivoted above intake ports 7 and 8 leading to the gyroscope. When relative displacement of the magnetic element and the adjustable base member 9 occurs, the air flow through the ports 7 and 8 is differentially disturbed, which is caused to operate a servo motor in the form of a small reversible turbine 10 in the casing 11 of the directional gyro 40. A course change is effected in this instance by rotating worm 11' of the magnetic compass, which turns large worm wheel 12 on the base 9. A flexible shaft 13 is shown as secured to the worm 11', which extends to a course change knob 14 on the panel. By connecting a compass dial 55 to shaft 13 at the panel, the course may be shown thereon.

The turbine 10 is driven in one direction or the other from a pair of oppositely directed nozzles 15 and 16 connected through suitable pipes 17 and 17' with the ports 7 and 8 on the magnetic compass. The turbine is hence driven in one direction or the other in accordance with the relative movement of the magnetic compass and its support 9. Rotation of the turbine wheel turns, through reduction gears 18, a pinion 18' meshing with a crown gear 61 journaled at the base of the gyroscope. The gear reduction is large, so as to average out the temporary deviations of the magnetic compass to some extent. At the top of the gyroscope is the usual pick-off means to control the rudder. In this instance this is shown as comprising a large worm wheel 27 journaled on the vertical axis of the gyroscope and carrying pick-off ports 28 and 29 which act in the usual manner to control the rudder servo motor in conjunction with semicircular cut-off plate 30, secured to the vertical ring 31 of the directional gyroscope 40, to which ring may be secured an annular compass card 40'. The follow-up movement from the rudder is also shown as differentially positioning the ports 28 and 29 from a repeat-back oil pressure cylinder 33 adjacent the relay valve 51 which controls the servo motor 52 connected to the rudder 53 or other control surface. Cylinder 33 moves the worm sleeve 26 axially to reposition the follow-up ports. Such a system is shown in detail in my prior application, now Patent #2,139,878, dated December 13, 1938, for Hydropneumatic automatic pilots. Course changes may be effected at the gyroscope by turning the knob 60 on shaft 24.

Figure 2:
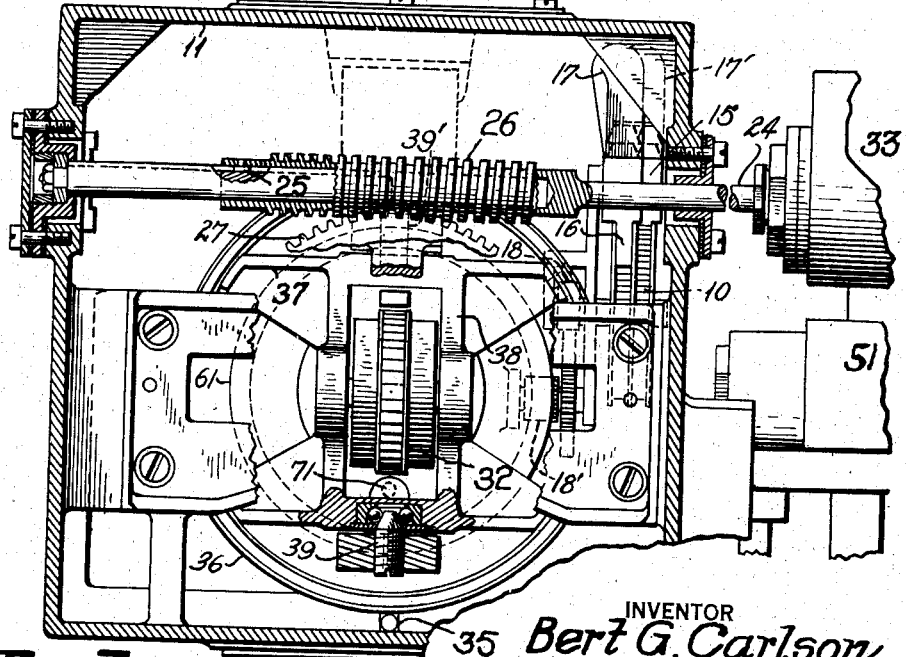
Fig. 2 is a horizontal section taken approximately on line 2—2 of Fig. 1, with parts broken away.
Figure 3:
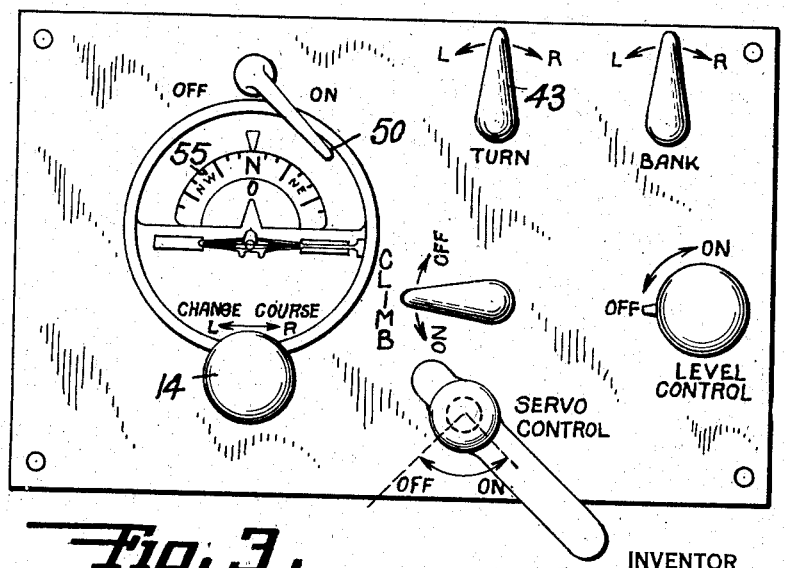
Fig. 3 is a front elevation of the controls on the panel.

Mounted on said crown gear 61 is a pipe 34 carrying an air nozzle 35, which directs a continuous jet of air downwardly against a ring 36 secured through brackets 37 to the rotor bearing ring 38 of the rotor 32. Said ring 36 is preferably provided with serrations 36' so as to increase the downwardly directed torque from the jet. However, as long as the jet is in alignment with the horizontal pivotal axis 39—39' of the rotor bearing ring in the vertical ring 31, as shown in Fig. 2, it will exert no effective torque on the gyroscope, as it has no lever arm. In Fig. 1 the jet is shown displaced 90° from its normal position in order to show the nozzle in this figure. As soon, however, as said jet is displaced with respect to said pivotal axis, i. e., from the position shown in Fig. 2, torque will be exerted about the horizontal axis of the gyroscope in proportion to a function of the extent of displacement, and in a direction dependent upon the direction of the displacement, which will precess the gyroscope back into its aligned position. It may hence be referred to as a slave gryo.

Differential pressure for supplying air to the several air jets above described, namely, the turbine jets 15, 16, the torque jet 35, and also the rotor spinning jet or jets 71, is supplied in the usual manner by connecting a source of negative pressure, such as a vacuum pump (not shown), to a pipe coupling 65 leading into the interior of the gyro casing 11, as indicated diagrammatically in Fig. 4. The continuous withdrawal of air from the casing draws air under atmospheric pressure in through channels 66 in the bottom of the gyro casing, which lead into a circular channel 67 in a member secured to the bottom of the vertical ring 31. Thence a portion of the air passes into channel 68 to which the pipe 34 is connected. Another portion of the air passes up through channel 70 in the vertical ring to the spinning nozzle or nozzles 71 therein. The air for the turbine nozzles 15 and 16 is drawn in through the pipes 17 and 17' connected either to the ports 7 and 8 at the magnetic compass or the ports 44 at the hand control handle 43 (as hereinafter described). Similarly, the air for the pick-off ports 28, 29 is brought in through channels 72 and 72' extending axially through the hub of the gear 27, which channels in turn communicate with circular channels 73 and 73' in the bearing member 74. Said annular channels, in turn, are connected to the pipes 75 and 76 leading to the air diaphragm chamber 77 connected to the relay valve 51, which chamber has suitable small leaks therein permitting restricted entry of atmospheric air.

While for ordinary course changes the aviator turns the knob 14, he also may make quick temporary turns or may steer entirely by another method, namely, by throwing the handle 50 to the "off" position and turning knob 43 to the right or left. Handle 50 rotates the valves 41 and 41' to disconnect the nozzles 15 and 16 from the magnetic compass and connect them to manually controlled valves 42 and 42', which are operated directly from the turn knob 43. Said valves 42 and 42' normally close the intake ports 44, but when the handle is turned in one direction or the other, the cam 45 on the same opens one or the other of the intake ports and permits air to enter the pipes 17, 17' leading to the nozzles. The ports 44 are preferably made larger than the ports 7 and 8 of the magnetic compass, so that the turbines are operated at a more rapid rate than from the magnetic compass so as to turn the pick-off ports 28, 29 on the gyroscope at the desired rate of turn of the ship.

As many changes could be made in the above construction and many widely different embodiments of this invention could be made without departing from the scope thereof, it is intended that all matter contained in the above description or shown in the accompanying drawings shall be interpreted as illustrative and not in a limiting sense.

Having described my invention, what I desire to claim and secure by Letters Patent is:

1. In a gyro-magnetic automatic steering device for craft, a magnetic compass, a remotely located directional gyroscope having a horizontal gimbal axis, a positional pick-off at the former, a servo-motor at the latter governed by said pick-off, a member oriented around said gyroscope by said motor, and a jet carried by said member normally lying in the same vertical plane as said gimbal axis, and adapted to exert a torque about said axis in one direction or the other upon relative turning of said jet out of said vertical plane in one direction or the other.

2. A gyro-magnetic automatic steering device for craft as claimed in claim 1 wherein said gyroscope has thereon a pick-off member for governing the steering and follow back means from the steering means for turning said member.

3. In a gyro-magnetic automatic steering device for craft, a magnetic compass, a remotely located directional gyroscope having a horizontal gimbal axis, a positional pick-off at the former, a servo-motor at the latter governed by said pick-off, a member oriented around said gyroscope by said motor, pick-off means at the gyroscope for controlling the position of the rudder, a jet carried by said member normally lying in the same vertical plane as said gimbal axis, and adapted to exert a torque about said axis in one direction or the other upon turning of said jet out of said vertical plane in one direction or the other, and alternative manual means for controlling the movements of said servo motor to cause a turn.

4. In a gyro-magnetic automatic steering device for craft, a magnetic compass, a remotely located directional gyroscope having a horizontal gimbal axis, a positional pick-off at the former, a servo motor at the latter governed by said pick-off, a member oriented around said gyroscope by said motor, pick-off means thereon for controlling the position of the rudder, a jet carried by said member normally lying in the same vertical plane as said gimbal axis, and adapted to exert a torque about said axis in one direction or the other upon relative turning of said jet out of said vertical plane in one direction or the other, and means for orienting the pick-off at the magnetic compass for changing course.

5. In a slave directional gyro, the combination with a rotor, a rotor bearing frame, in which said rotor is journalled on a normally horizontal spin axis, a vertical ring, pivots pivotally mounting said frame in said ring for oscillation about a second horizontal axis normal to said spin axis, said ring being turnable about a vertical axis, means for applying a weak but continuous torque on said ring normally lying in the same vertical plane as said pivots of said bearing frame in said vertical ring, and means for orienting said torque means to cause the gyro to slowly follow.

6. In a gyro-magnetic automatic steering device, the combination with a slave gyroscope and a remote magnetic compass, a positional controller at said compass, servo-means at the gyroscope controlled by said controller for causing the gyroscope to follow the compass, means displacing the compass controller for changing course, and alternative means for causing turning including manual means for operating said servo-means at will.

7. In a two-unit gyro magnetic compass, the combination with a magnetic compass and a separate directional gyroscope having a compass card thereon and a horizontal gimbal axis, of a positional pick-off on said magnetic compass, a servo motor at the gyroscope governed by said pick-off, a member oriented around said gyroscope governed by said pick-off, a member oriented around said gyroscope by said motor, and a jet carried by said member normally lying in the same vertical plane as said gimbal axis, and adapted to exert a torque about said axis in one direction or the other upon relative turning of said jet out of said vertical plane in one direction or the other.

8. In a gyro magnetic compass, a rotor, a rotor bearing frame in which said rotor is journalled on a normally horizontal spin axis, a vertical ring, a compass card thereon, pivots pivotally mounting said frame in said ring for oscillation about a second horizontal axis normal to said spin axis, said ring being turnable about a vertical axis, means for applying a weak but continuous torque on said ring normally lying in the same vertical plane as the pivots of said bearing frame, a magnetic compass, and means operated therefrom for orienting said torque means to cause the gyro to slowly follow the magnetic compass.

BERT GAGE CARLSON.